(12) United States Patent  
Marcie

(10) Patent No.: US 6,418,203 B1  
(45) Date of Patent: Jul. 9, 2002

(54) SYSTEM AND METHOD FOR COMMUNICATING AUDIO INFORMATION BETWEEN A COMPUTER AND A DUPLEX SPEAKERPHONE MODEM

(75) Inventor: Patrick Marcie, San Antonio, TX (US)

(73) Assignee: Data Race, Inc., San Antonio, TX (US)

( * ) Notice: Subject to any disclaimer, the term of this patent is extended or adjusted under 35 U.S.C. 154(b) by 0 days.

(21) Appl. No.: 09/481,097

(22) Filed: Jan. 11, 2000

Related U.S. Application Data

(63) Continuation of application No. 08/870,198, filed on Jun. 6, 1997.

(51) Int. Cl.$^7$ .......................... H04M 11/00; H04M 1/00
(52) U.S. Cl. .............................. 379/90.01; 379/93.05; 379/420.01
(58) Field of Search .......................... 379/88.02, 88.07, 379/88.13, 90.01, 93.01, 93.05–93.09, 93.14–93.17, 93.23, 100.16, 110.01, 388.01–388.02, 420.01, 195; 370/352, 355, 435, 465, 260, 266; 340/825.25, 825.44; 455/556–557; 375/222, 246, 377; 704/200, 258; 361/686, 688; 439/638, 928.1; 710/101, 128; 348/15; 381/109, 306

(56) References Cited

U.S. PATENT DOCUMENTS

| | | | |
|---|---|---|---|
| 4,414,432 A | 11/1983 | Skerlos et al. | 379/110.01 |
| 4,578,537 A | 3/1986 | Faggin et al. | 379/93.09 |
| 4,597,077 A | 6/1986 | Neslon et al. | 370/352 |
| 4,614,144 A | 9/1986 | Sagara et al. | 235/375 |
| 4,679,191 A | 7/1987 | Nelson et al. | 370/355 |
| 4,750,171 A | 6/1988 | Kedar et al. | 370/445 |
| 4,916,607 A | 4/1990 | Teraichi et al. | 379/100.16 |
| 4,972,457 A | 11/1990 | O'Sullivan | 455/556 |
| 4,979,144 A | 12/1990 | Mizuta | 711/115 |
| 5,136,631 A | 8/1992 | Einhorn et al. | 379/88.02 |

(List continued on next page.)

OTHER PUBLICATIONS

Bryan, J., "PCMCIA: Past, Present and Promise", BYTE Magazine, pp. 65–72, Nov. 1994.
Rigney, S., "Socket to Us: PCMCIA Connectivity", PC Magazine, pp. 207–212, Jan. 24, 1995.

(List continued on next page.)

*Primary Examiner*—Curtis Kuntz
*Assistant Examiner*—George Eng
(74) *Attorney, Agent, or Firm*—Conley, Rose & Tayon, PC; Robert C. Kowert

(57) ABSTRACT

A modem configurable to operate in a normal mode to perform data communications on the Public Switched Telephone Network (PSTN) additionally configurable to operate in a duplex speakerphone mode. Preferably, the modem is a Personal Computer Memory Card Industry Association (PCMCIA) card for insertion into a connector in a portable computer. The computer includes a sound system with associated microphone and speaker that is incorporated in or associated with the portable computer as the audio input and output for the speakerphone operation. The modem incorporates an interface which allows digitized audio samples from the coder portion of a voice coder-decoder (CODEC) on the modem to be communicated to the computer and digitized audio samples from the computer's sound system to be communicated to the decoder portion of the modem's CODEC. The interface is configured in a manner which is transparent to the modem's normal data communications functions, i.e., which enables conventional modem software to operate the modem in the normal mode without requiring modification to the conventional modem software. Preferably, the modem includes a digital signal processor (DSP) which performs electrical and acoustic echo cancellation and automatic gain control on the audio samples. The interface appears to the DSP as a conventional audio CODEC.

33 Claims, 6 Drawing Sheets

U.S. PATENT DOCUMENTS

| | | | | |
|---|---|---|---|---|
| 5,192,999 A | * | 3/1993 | Graczyk et al. | 379/93.17 |
| 5,274,738 A | | 12/1993 | Daly et al. | 704/200 |
| 5,297,231 A | * | 3/1994 | Miller | 704/200 |
| 5,317,630 A | | 5/1994 | Feinberg et al. | 379/93.06 |
| 5,333,266 A | | 7/1994 | Boaz et al. | 379/88.13 |
| 5,335,276 A | | 8/1994 | Thompson et al. | 379/201 |
| 5,349,640 A | | 9/1994 | Dunn et al. | 379/201 |
| 5,353,334 A | | 10/1994 | O'Sullivan | 379/93.05 |
| 5,361,061 A | | 11/1994 | Mays et al. | 340/825.44 |
| 5,392,223 A | | 2/1995 | Caci | 348/17 |
| 5,408,614 A | | 4/1995 | Thornton et al. | 375/222 |
| 5,411,405 A | | 5/1995 | McDaniels et al. | 361/686 |
| 5,420,852 A | | 5/1995 | Anderson et al. | 370/364 |
| 5,423,697 A | | 6/1995 | MacGregor | 439/638 |
| 5,426,564 A | | 6/1995 | Hsu | 361/688 |
| 5,428,663 A | | 6/1995 | Grimes et al. | 340/825.44 |
| 5,437,019 A | | 7/1995 | Brockmann | 711/5 |
| 5,440,585 A | | 8/1995 | Partridge, III | 375/222 |
| 5,444,768 A | | 8/1995 | Lemaire et al. | 379/93.01 |
| 5,444,869 A | | 8/1995 | Stricklin et al. | 455/575 |
| 5,445,525 A | | 8/1995 | Broadbent et al. | 361/686 |
| 5,457,782 A | | 10/1995 | Daly et al. | 704/200 |
| 5,463,742 A | | 10/1995 | Kobayashi | 361/686 |
| 5,471,470 A | * | 11/1995 | Sharma et al. | 370/435 |
| 5,475,691 A | | 12/1995 | Chapman et al. | 370/527 |
| 5,481,616 A | | 1/1996 | Freadman | 361/686 |
| 5,483,530 A | | 1/1996 | Davis et al. | 370/465 |
| 5,509,811 A | | 4/1996 | Homic | 439/55 |
| 5,515,423 A | | 5/1996 | Beck et al. | 379/93.07 |
| 5,517,646 A | | 5/1996 | Piccirillo et al. | 713/1 |
| 5,519,641 A | | 5/1996 | Beers et al. | 709/208 |
| 5,524,047 A | | 6/1996 | Brown et al. | 379/93.05 |
| 5,526,408 A | | 6/1996 | Yekutiely | 379/93.01 |
| 5,574,682 A | | 11/1996 | Shinohara | 361/686 |
| 5,602,902 A | | 2/1997 | Satterlund | 379/93.14 |
| 5,606,599 A | | 2/1997 | O'Mahoney et al. | 379/93.09 |
| 5,664,218 A | * | 9/1997 | Kim et al. | 348/15 |
| 5,692,211 A | * | 11/1997 | Gulick et al. | 710/101 |
| 5,701,515 A | | 12/1997 | Gradeler | 710/14 |
| 5,752,082 A | | 5/1998 | Staples | 379/93.05 |
| 5,799,036 A | | 8/1998 | Staples | 375/222 |
| 5,809,261 A | | 9/1998 | Lambrecht | 710/101 |
| 5,812,870 A | | 9/1998 | Kinkinis et al. | 712/32 |
| 5,822,692 A | | 10/1998 | Krishnan et al. | 340/825.44 |
| 5,854,908 A | * | 12/1998 | Ogilvie et al. | 710/128 |
| 5,864,811 A | * | 1/1999 | Tran et al. | 704/258 |
| 5,940,459 A | * | 8/1999 | Hsu et al. | 375/377 |
| 5,963,652 A | * | 10/1999 | Tran et al. | 381/109 |
| 6,205,124 B1 | * | 3/2001 | Hamdi | 379/93.07 |

OTHER PUBLICATIONS

Nass, Richard ("Nass I"), "PCMCIA Fax–Modem and LAN Run Simultaneously", Electronic Design pp. 131–132, Oct. 3, 1994.

Anderson, D., "PCMCIA System Architecture", Mindshare, Inc., 1994, pp. 1–50.

Nass, Richard ("Nass II"), "Multifunction Cards Pose Design Challenges", Electronic Design, pp. 51–53, Oct. 3, 1994.

* cited by examiner

SYSTEM AND METHOD FOR COMMUNICATING AUDIO INFORMATION BETWEEN A COMPUTER AND A DUPLEX SPEAKERPHONE MODEM

This application is a continuation of application Ser. No. 08/870,198 filed Jun. 6, 1997.

FIELD OF THE INVENTION

The present invention relates in general to telephony communications and more particularly to interfacing a computer with a modem for speakerphone voice communications.

DESCRIPTION OF THE RELATED ART

Voice communications over the Public Switched Telephone Network (PSTN) are becoming an increasingly important aspect of computing. In particular, speakerphone operation has increasingly been offered as an optional feature of data modems. Such features allow the user to automatically dial or answer the telephone and speak to another person without the need for a telephone instrument and in a "hands-free" manner. This operation is accomplished by employing a Digital Signal Processor (DSP) in the modem. The DSP manipulates local audio information, consisting of microphone input and speaker output, to perform echo cancellation and automatic gain control functions necessary for high-quality duplex speakerphone operation. In some models of the Compaq® Presario computers, for example, a voice coder-decoder (CODEC) in a modem is coupled directly to an external microphone and speaker by physical wires and plugs. This method, however, is inconvenient for portable computer applications because the external microphone and speaker add bulk and weight.

Many portable and notebook computers currently offered include internal sound systems which incorporate a microphone and a speaker which could, if properly interfaced, be used as the audio input and output for speakerphone operation. Co-pending U.S. application Ser. No. 08/496,537 titled "Computer System Which Provides Analog Audio Communication Between a PC Card and the Computer's Sound System" filed Jun. 29, 1995, whose inventor is Leven E. Staples, and which is DATARACE, describes a modem with a CODEC directly connected to the microphone and speaker amplifier inside the computer in an analog fashion by multiplexing the use of pins in the computer-to-modem interface connector. This embodiment solves the portability problems, but requires a special implementation of the computer's computer-to-modem interface which is not found in many commercial computer offerings.

Co-pending U.S. application Ser. No. 08/544,054 titled "Computer System Which Provides Digital Audio Communication Between A PC Card and the Computer's Sound System" filed Oct. 17, 1995, whose inventor is Leven E. Staples, and which is assigned to DATARACE, describes a modem which multiplexes use of certain high address pins of a PCMCIA bus to transfer digital audio data from the modem to a CODEC in a sound card. This embodiment also solves the portability problems, but requires a non-standard use of the PCMCIA bus.

Therefore an interface for passing audio data between a portable computer's internal sound system and a modem having duplex speakerphone capability which is compatible with existing electrical computer-to-modem interfaces is desired.

SUMMARY OF THE INVENTION

The present invention comprises a host computer system including one or more buses, a processor, modem and sound system configured to operate as a full duplex speakerphone. The sound system is coupled to a speaker and microphone of the computer. The modem is coupled to a telephone line which transfers audio signals via the PSTN between the subscriber using the computer as a speakerphone and a remote subscriber. The modem is configurable to operate in a speakerphone mode as will be described below. In addition, the modem may be configured in a normal mode, i.e., a data communications mode, to perform data communications, such as fax transmission or the transmission of Internet data, between the computer system and a data communications device on the telephone line.

The sound system receives a first analog audio input signal from the microphone and converts the first analog audio input signal into first digital audio output samples. The first digital audio output samples from the sound system are transferred to the modem, preferably by the host processor, a DMA controller, or through an intelligent bus master. The modem converts the first digital audio output samples into a first analog audio output signal for transmission on the telephone line. Conversely, the modem receives a second analog audio input signal from the telephone line and converts the second analog audio input signal into second digital audio samples. The second digital audio samples are transferred from the modem to the sound system. The sound system receives the second digital audio samples and converts the second digital audio samples into a second analog audio output signal for transmission to the speaker. Thus, the local subscriber utilizes the computer system as a speakerphone to perform audio communications with the remote subscriber.

In the preferred embodiment, the modem is comprised on a PC Card (formerly PCMCIA card) or CardBus card. In this embodiment, the computer system further comprises one or more PC Card slots, and the modem includes a PC Card interface portion for interfacing to the PC Card slots. This embodiment is particularly advantageous for use in notebook or portable computers which typically include PC Card slots. In an alternate embodiment, the modem is coupled to the processor via an expansion bus, such as an Industry Standard Architecture (ISA) bus, a Peripheral Component Interconnect (PCI) bus, an SBus or a NuBus.

The modem includes an interface device which couples the modem to the processor via the PCMCIA bus or expansion bus. The modem further includes a coderdecoder (CODEC) coupled to the interface device. The interface device receives the first digital audio output samples and provides the first digital audio output samples to the CODEC. The CODEC receives the first digital audio output samples from the interface device and converts the first digital audio output samples into the first analog audio output signal for transmission on the telephone line. The CODEC receives the second analog audio input signal from the telephone line and converts the second analog audio input signal into the second digital audio samples. The interface device receives the second digital audio samples from the CODEC and provides the second digital audio samples to the bus.

The interface device includes a parallel to serial converter which receives the first digital audio samples from the bus in a parallel format, converts the first digital audio samples from a parallel format into a serial format, and provides the first digital audio samples to the CODEC in the serial format. The interface device further includes a serial to parallel converter which receives the second digital audio samples from the CODEC in a serial format, converts the second digital audio samples from a serial format into a parallel format, and provides the second digital audio samples to the bus in a parallel format. The interface device further includes interrupt logic for generating an interrupt to the processor or DMA controller upon completion of a transfer of one or more of the first digital audio samples from the parallel to serial converter to the CODEC and upon completion of a transfer of one or more of the second digital audio samples from the CODEC to the serial to parallel converter.

The modem further includes a digital signal processor (DSP) coupled between the CODEC and the interface device. The DSP transfers the first and second digital audio samples between the CODEC and the interface device. In addition, the DSP controls data communications between the computer system and a data communications device coupled to the telephone line. Preferably, the DSP and the interface device are coupled by a serial audio CODEC bus for transferring the first and second digital audio samples between the CODEC and the interface device in the serial format. The DSP and interface device are also coupled by a parallel data bus for transferring data associated with the data communications between the CODEC and the interface device. Preferably, the DSP performs echo cancellation and automatic gain control on the first and second digital audio samples as they are transferred between the CODEC and the interface device.

BRIEF DESCRIPTION OF THE DRAWINGS

A better understanding of the present invention can be obtained when the following detailed description of the preferred embodiment is considered in conjunction with the following drawings, in which.

Figure 1:
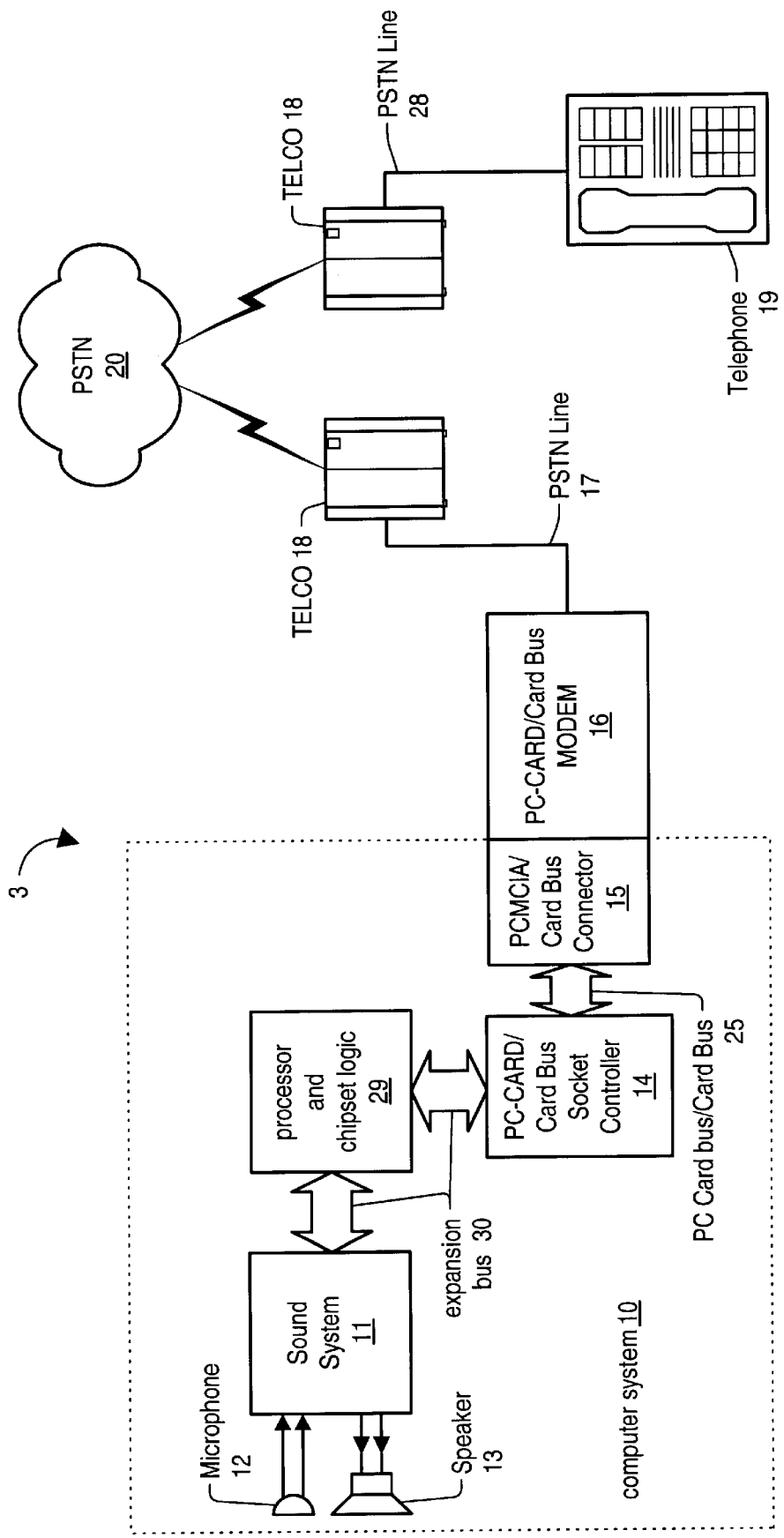
FIG. 1 is a block diagram of a telecommunications system including a computer system with a modem according to the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE SPECIFIC EMBODIMENTS

FIG. 1—Telecommunications System Block Diagram

Referring now to FIG. 1, a block diagram of a telecommunications system 3 according to the present invention is shown. The telecommunications system 3 comprises computer system 10, including a modem 16. The modem 16 is coupled to a telephone line 17 for connection with the Public Switched Telephone Network (PSTN) 20. A telephone 19 is also coupled to the PSTN 20 by a second telephone line 28. The PSTN 20 comprises one or more telephone company (TELCO) central offices (CO) 18 which provide a communications path between the modem 16 and the telephone 19. The computer system 10 includes a sound system 11. The computer system 10 also includes a microphone 12 and speaker 13 which are coupled to the sound system 11 which enable a subscriber at the computer 10 to use the computer 10 as a duplex speakerphone for performing voice communications with a subscriber at the telephone 19. The modem 16 may also be selectively used in a conventional mode to perform data communications between a remote data communications device (not shown) and the computer 10 via the telephone line 17 and PSTN 20.

The computer system 10 comprises a processor and chip set logic 29, such as an x86 architecture processor, or the PowerPC® processor, and associated chipset, coupled to a sound system 11. The processor and chipset logic 29 may be any of various types of processor and chipset logic. In one embodiment, the chipset logic 29 includes a direct memory access (DMA) controller for performing transfers of audio data samples between the sound system 11 and the modem 16. The sound system 11 comprises circuitry, such as an audio coder-decoder (CODEC), for receiving an audio input signal from the microphone 12 and converting the audio input signal into digital audio data samples representing the audio input signal. The sound system 11 circuitry is also configured to receive digital audio data samples and convert the digital audio data samples into an audio output signal to the speaker 13. The digital audio data samples are transferred between the sound system 11 and the modem 16 by the processor 29 or the DMA controller or by the modem 16 itself acting as a bus master.

In the preferred embodiment, the computer system further comprises a Personal Computer Memory Card International Association (PCMCIA), or PC Card, socket controller 14 coupled to the processor. The PCMCIA socket controller 14 is also referred to as a PCMCIA host bus adapter or PC Card adapter. The PCMCIA socket controller 14 provides an interface, or PC Card bus 25, which conforms to the PCMCIA specification. Thus, PCMCIA cards which conform to the PCMCIA specification may be inserted into slots disposed within the computer 10 which house a PCMCIA connector 15 for receiving PCMCIA cards, such as the modem 16. The PCMCIA socket controller 14 adapts one or more PCMCIA slots to a host or expansion bus 30, such as the Industry Standard Architecture (ISA) bus, Peripheral Component Interconnect (PCI) bus, SBus, or NuBus provided by a bus bridge in the chip set logic 29.

In one embodiment, the PC Card bus 25 conforms to the Card Bus specification, a later version of the PC Card bus specification, which provides for bus master data transfers on the Card Bus 25. In this embodiment, the modem 16 includes bus mastering logic for becoming master of the Card Bus 25 and transferring audio data samples between the modem 16 and the sound system 11 or between the modem 16 and system memory.

In one embodiment, the computer system 10 further includes an Intelligent Input/Output (I2O) processor coupled to the expansion bus 30 for moving audio data samples between the modem 16 and the sound system 11. The I2O processor is operable to receive I/O commands from the processor 29 and in response to transfer the audio data samples between the modem 16 and the sound system 11.

Figure 1A:
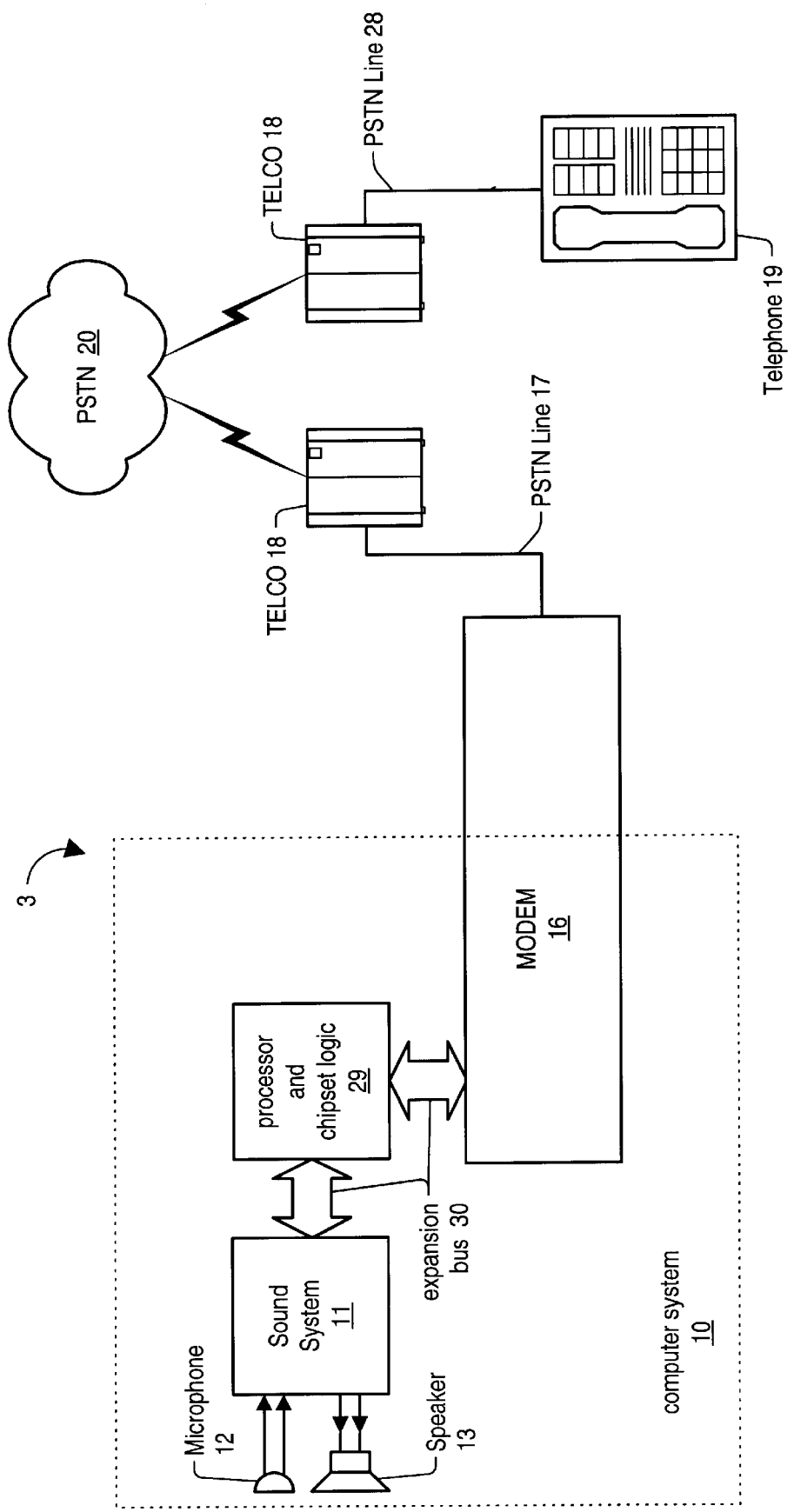

In an alternate embodiment, shown in FIG. 1a, the modem 16 couples directly to the expansion bus 30, such as an ISA or PCI bus, rather than through a PCMCIA slot. As will be shown, the present invention advantageously eliminates the need to connect a cable between the sound system and the modem of the computer, which is particularly difficult within a notebook or portable computer. However, notebook and portable computers typically include one or more PCMCIA slots. Thus, the PCMCIA embodiment of the present invention is particularly advantageous in notebook or portable computer applications. Preferably, the modem 16 is a PCMCIA modem and will be described in more detail with reference to FIG. 2.

Referring again to FIG. 1, in an example of a voice communications session between the local subscriber using the computer 10 as a speakerphone and the remote subscriber using the telephone 19, the computer 10 initiates a telephone call by executing a communications program which sends dialing commands to the modem 16. The modem 16 converts the dialing commands into tone or pulse sequences and transmits the sequences to the CO 18. In response to the sequences, the CO 18 rings the remote telephone set 19. After sending the dialing commands to the modem 16, and receiving confirmation status, the computer 10 executes a program which commands the modem 16 to enter a speakerphone mode.

Subsequently, the remote subscriber speaks into the telephone 19 to answer the call. Audio signals of the remote subscriber's speech are transferred through the PSTN 20 and arrive at the modem 16 on the telephone line 17. The modem 16 converts the incoming analog audio signal into digital audio data samples and notifies the processor 29 of the presence of one or more of the audio samples. The processor 29 then transfers the audio samples on the PC Card bus 25 and/or expansion bus 30 to the sound system 11. The sound system 11 converts the audio samples into an analog audio output signal and provides the audio signal to the speaker 13 which reproduces the remote subscriber's speech so that it may be heard by the local subscriber.

In response, the local subscriber speaks into the microphone 12, which responsively transmits an analog audio signal to the sound system 11. The sound system 11 converts the audio signal into digital audio data samples and notifies the processor 29 of the presence of one or more of the samples. The processor 29 responsively transfers the samples from the sound system 11 on the PC Card bus 25 and/or expansion bus 30 to the modem 16. The modem 16 converts the samples into an analog audio output signal which is transmitted on the telephone line 17 and through the PSTN 20 to the remote subscriber's telephone 19, through which the remote subscriber hears the local subscriber's speech. It is noted that in the above example the audio data sample transfers between the modem 16 and the sound system 11 are performed by the processor 29. However, the transfer of the audio data samples may be performed by various other means, as mentioned above, which should be noted with reference to the remainder of the specification.

Figure 2:
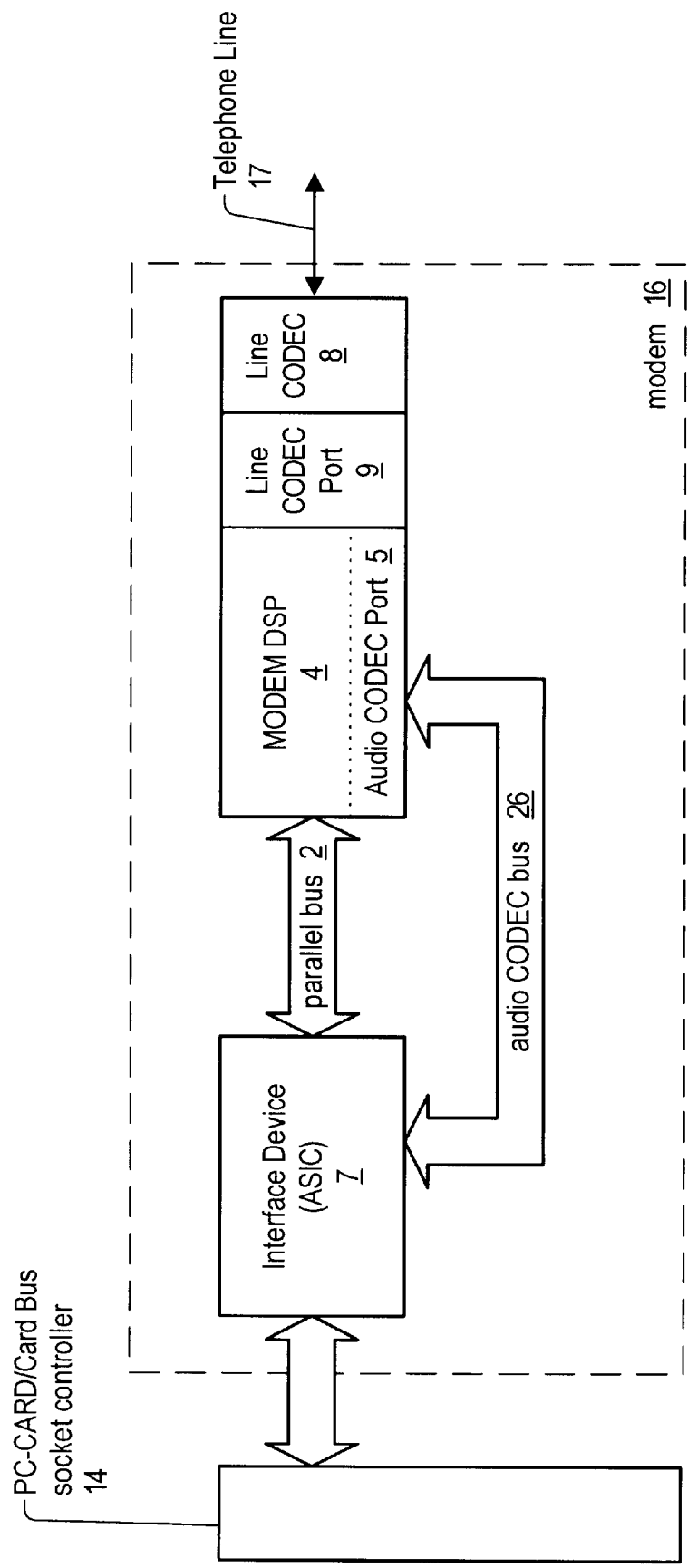
FIG. 2 is a block diagram of the modem of FIG. 1 including an interface device according to the present invention.

FIG. 2—Modem Block Diagram

Referring now to FIG. 2, a block diagram of the modem 16 of FIG. 1 including an interface device 7 according to the present invention is shown. The modem 16 comprises an interface device 7 for interfacing to the PCMCIA socket controller 15 and a line CODEC 8 coupled to the telephone line 17 as shown. Preferably, the modem 16 further comprises a digital signal processor (DSP) 4 which includes a line CODEC port 9 for interfacing with the line CODEC 8, and an audio CODEC port 5 for interfacing with the interface device 7.

The interface device 7 comprises three interfaces: one for interfacing with the PCMCIA socket controller 15; one for interfacing with the audio CODEC port 5 on an audio CODEC bus 26; and one for interfacing with the DSP 4 on a parallel bus 2 for transferring data associated with data communications between the computer 10 and a remote data communications device (not shown) through the PSTN 20. The interface device 7 will be described in more detail with reference to FIG. 3.

The DSP 4 executes program instructions to perform various conventional modem functions when the modem 16 is configured in the normal data communications mode. In addition, when the modem 16 is configured in the speakerphone mode, the DSP 4 performs audio-related functions. In particular, the DSP 4 performs echo cancellation necessary for proper operation of the computer 10 as a speakerphone. An acoustic echo path exists between the speaker 13 and microphone 12. In addition, echo may occur due to impedance mismatches between the modem 16 and the telephone line 17 and CO 18. The acoustic echo generated along the acoustic echo path and the impedance mismatch-generated echo are advantageously substantially canceled via digital signal processing techniques performed by the DSP 4. This arrangement is advantageous in that it does not require additional echo cancellation circuitry and it also alleviates the system processor 29 from having to perform the echo cancellation. Furthermore, the DSP 4 performs digital signal processing techniques to effect automatic gain control (AGC) of the audio information as a function of the dynamic range of the line CODEC 8.

During operation of the modem 16 in the speakerphone mode, the line CODEC 8 receives an analog audio input signal from the telephone line 17 and converts the audio input signal into digital audio data samples. The DSP 4 receives the audio samples from the line CODEC 8 and preferably performs digital signal processing on the audio samples, such as described above. The DSP 4 then provides the processed audio samples on the audio CODEC bus 26 to the interface device 7 via the audio CODEC port 5. Preferably, the audio CODEC bus 26 is a 4-wire bus comprising Data In, Data Out, Clock and Sync signals. Thus, the interface device 7 appears to the DSP 4 as a conventional audio CODEC, thereby enabling a relatively inexpensive pre-programmed modem/speakerphone DSP device to be employed in the modem 16. That is, preferably the data samples are transferred between the interface device 7 and the audio CODEC port 5 in a serial manner as will be described below.

Conversely, during operation of the modem 16 in the speakerphone mode, the interface device 7 receives audio data samples from the processor 29 and provides the audio samples to the audio CODEC port 5 of the DSP 4 via the audio CODEC bus 26. The DSP 4 receives the audio samples and preferably performs digital signal processing on the audio samples, such as described above. The DSP 4 then provides the processed samples to the line CODEC 8. The line CODEC 8 converts the audio samples into an analog audio output signal for transmission on the telephone line 17.

During operation of the modem 16 in the normal mode, i.e., the data communications mode, the line CODEC 8 receives modulated analog signals from the telephone line 17 and converts the demodulated analog signals into modulated digital data. The CODEC 8 provides the modulated digital data to the DSP 4. The DSP 4 demodulates the modulated digital data into un-modulated digital data, i.e., digital data. The digital data may be fax data, Internet data, etc. The DSP 4 then provides the digital data to the interface device 7 via the parallel bus 2. The interface device 7 then notifies the processor 29 of the presence of the data and in response the processor 29 retrieves the data from the modem 16. Conversely, the processor 29 provides digital data to the interface device 7, which in turn provides the data to the DSP 4 via the parallel bus 2. The DSP 4 then modulates the digital data and provides the modulated digital data to the line CODEC 8 which converts the modulated digital data into a modulated analog signal for transmission on the telephone line 17.

Figure 2A:
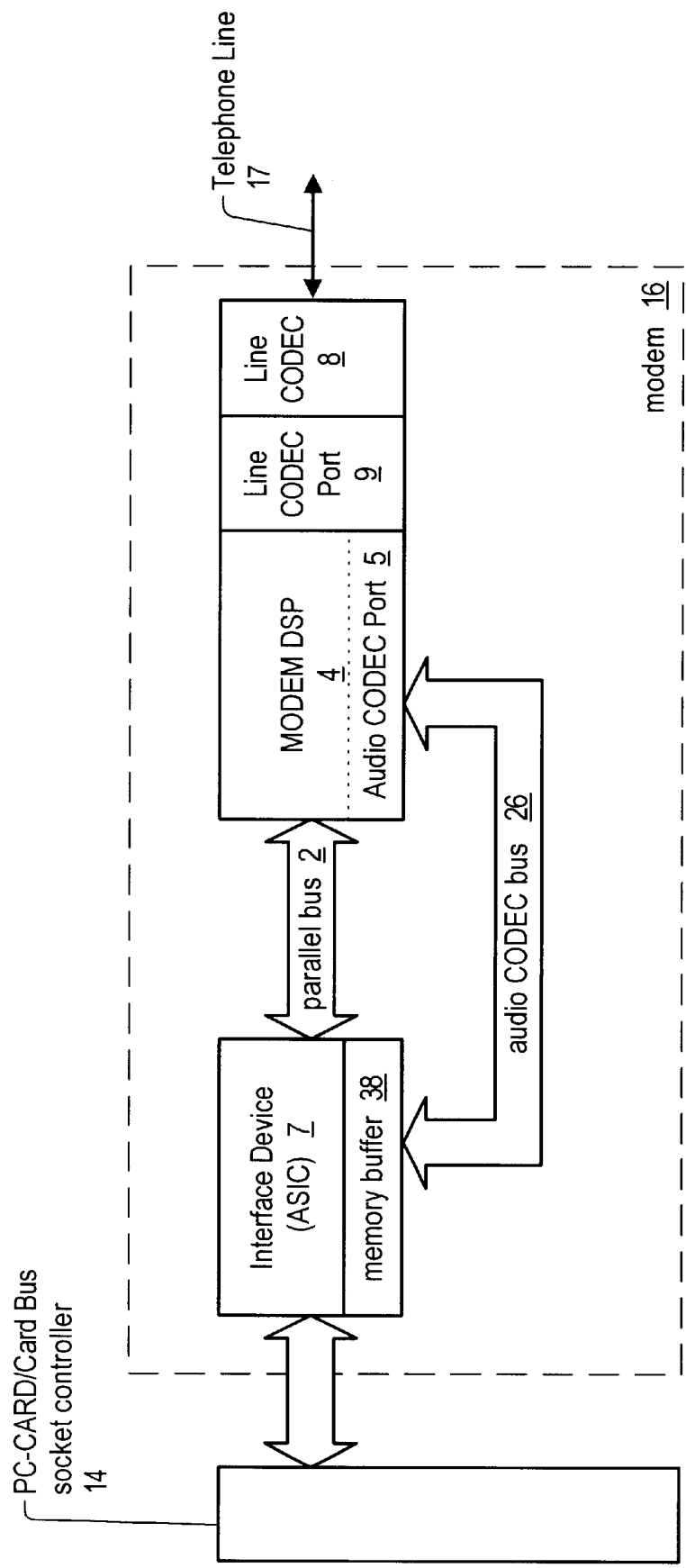

Referring now to FIG. 2a, an alternate embodiment is shown in which the interface device 7 further comprises a memory buffer 38 for storing audio data samples. In this embodiment, the data samples are transferred between the memory buffer 38 and the sound system 11 either a) by the modem 16 acting as a bus master of the Card Bus 25 or of the expansion bus 30; b) by a DMA controller comprised in the chipset 29; or c) by the processor 29.

Figure 3:
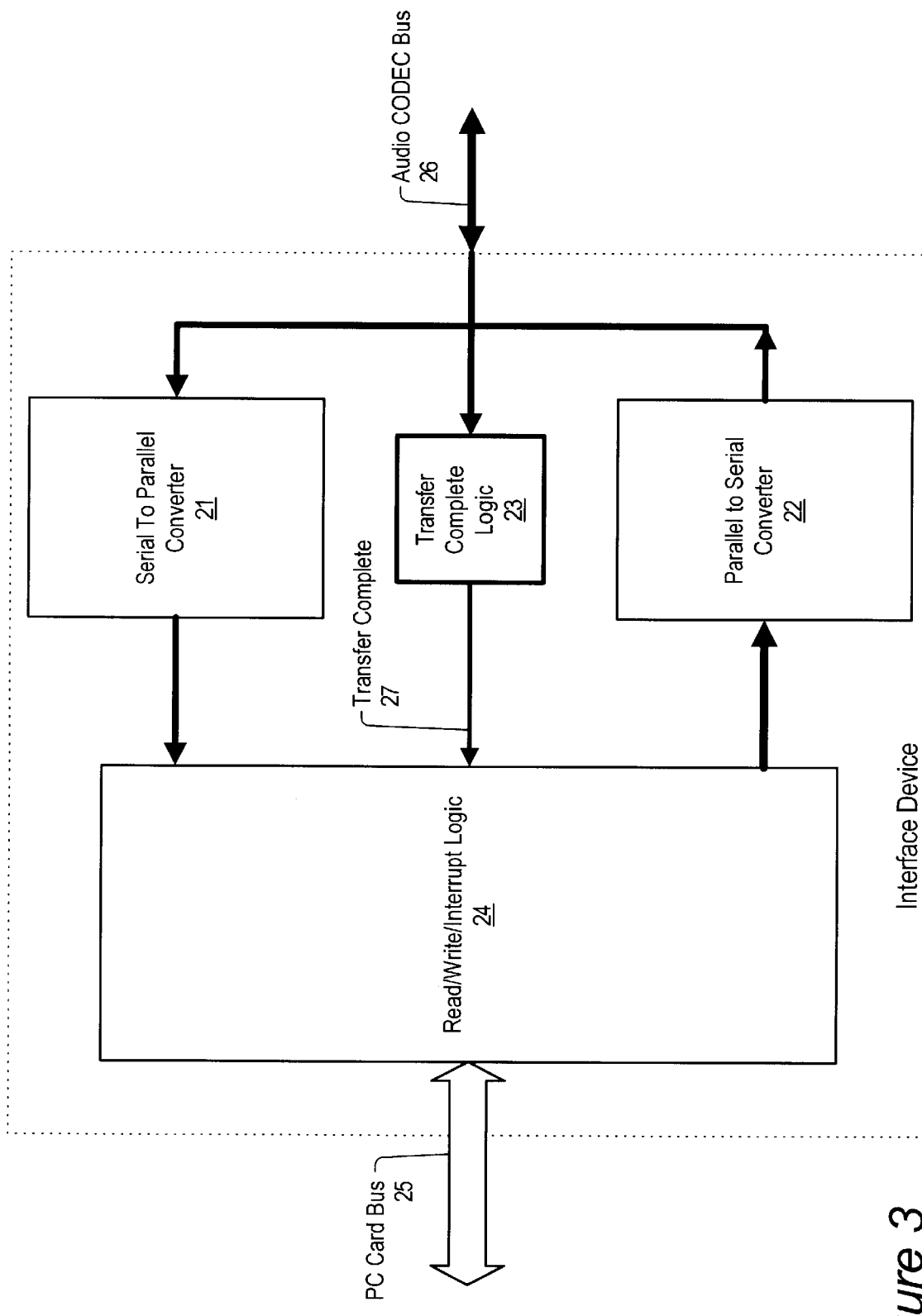
FIG. 3 is a block diagram of the interface device of FIG. 2.

FIG. 3—Interface Device Block Diagram

Referring now to FIG. 3, a block diagram of the interface device 7 of FIG. 2 is shown. The interface device 7 comprises a serial to parallel converter circuit 21, a parallel to serial converter circuit 22, and transfer complete logic 23 each coupled to the audio CODEC bus 26. The interface device 7 further comprises read/write/interrupt logic 24 coupled to a PCMCIA bus 25 provided by the PCMCIA socket controller 14. The read/write/interrupt logic 24 is further coupled to the serial to parallel converter 21 and parallel to serial converter 22. Furthermore, the read/write/interrupt logic 24 receives a transfer complete signal 27 from the transfer complete logic 23 to indicate the completion of a transfer of an audio data sample into the serial to parallel converter 21 or out of the parallel to serial converter 22.

The serial to parallel converter 21 receives digital audio data samples in a serial format from the DSP 4 via the audio CODEC bus 26 and converts the samples from the serial format to a parallel format. The serial to parallel converter 21 then stores the samples in a parallel format until the samples are retrieved by the processor 29. The transfer complete logic 23 monitors the transfer of the serial data samples into the serial to parallel converter 21 and notifies the read/write/interrupt logic 24 of the completion of a transfer of a data sample via the transfer complete signal 27. In response, the read/write/interrupt logic 24 generates an interrupt via the PCMCIA bus 25 or expansion bus to the processor 29. In response to the interrupt, the processor 29 retrieves the audio data sample in the parallel format from the serial to parallel converter 21 through the read/write/interrupt logic 24 across the PCMCIA bus 25 or expansion bus. The processor 29 then provides the audio data sample to the sound system 11.

The processor 29 transfers digital audio data samples from the sound system 11 to the interface device 7 across the PCMCIA bus 25 in a parallel format. The parallel format audio samples are routed through the read/write/interrupt logic 24 to the parallel to serial converter 22 wherein the samples are stored until being retrieved by the DSP 4. The parallel to serial converter 22 converts the samples from the parallel format to a serial format. The samples are then transferred to the DSP 4 in a serial format via the audio CODEC bus 26. The transfer complete logic 23 monitors the transfer of the serial data samples from the parallel to serial converter 22 and notifies the read/write/interrupt logic 24 of the completion of a transfer of a data sample via the transfer complete signal 27. In response, the read/write/interrupt logic 24 generates an interrupt via the PCMCIA bus 25 to the processor 29. In response to the interrupt, the processor 29 retrieves another audio data sample in the parallel format from the sound system 11 and provides the sample to the interface device 7.

Preferably, the transfer cycles of audio samples from the DSP 4 to the serial to parallel converter 21 coincide with transfer cycles of audio samples from the parallel to serial converter 22 the DSP 4.

Advantageously, the interface device 7 and DSP 4 provide a conventional data modem interface, such as an Industry standard AT command set interface, to the processor 29 for transfer of conventional modem command, status and data. Thus, when the modem 16 is configured in the normal, i.e., data communications mode, current software programs executing on the processor 29 may perform data communications with the modem 16 without requiring modification to the modem software.

Figure 4:
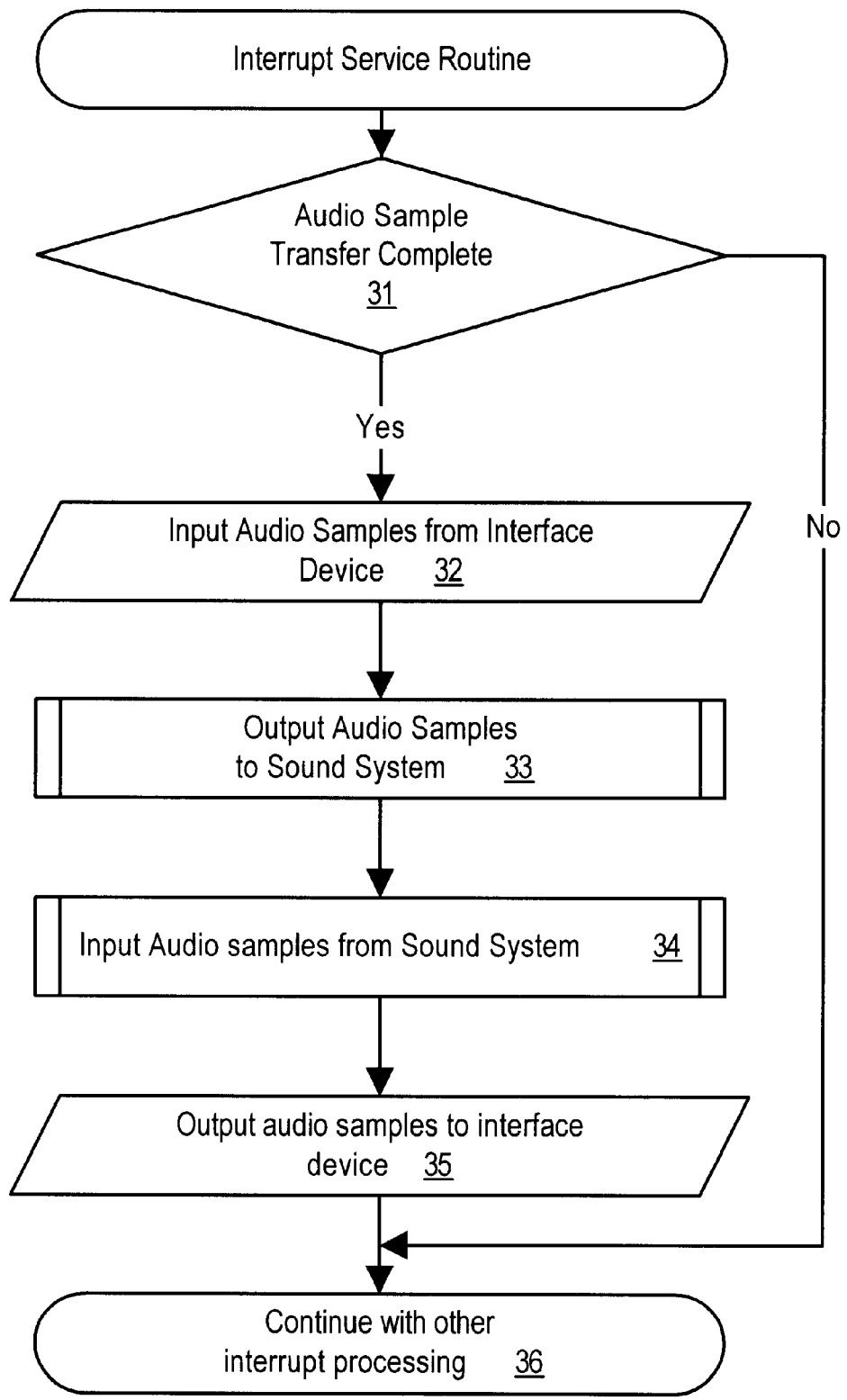
FIG. 4 is a flowchart illustrating operation of the computer processor of FIG. 1 to control the transfer of audio data samples between the sound system and modem according to the present invention.

FIG. 4—Audio Data Sample Movement Flowchart

Referring now to FIG. 4, a flowchart illustrating operation of the computer processor 29 of FIG. 1 to control the transfer of audio data samples between the sound system 11 and modem 16 according to the present invention is shown. Preferably, the steps described in FIG. 4 are performed by software program instructions comprised in an interrupt service routine (ISR) executed by the processor 29 in response to the interrupts generated by the modem 16, or by an interrupt generated by the sound system 11, or by an interrupt generated by another interrupt source, such as a system timer.

In one embodiment, the DSP 4 of the modem 16 is operable to generate interrupts to the processor 29. The interface device 7 is operable to generate interrupts to the processor 29 as described above, to indicate the completion of an audio sample transfer cycle. In addition, the DSP 4 generates interrupts to the processor 29 when in the normal data communications mode to indicate the presence of data, among other reasons. In one embodiment, one or more of the interrupt sources share the same interrupt request signal. The ISR determines if the cause of the interrupt is the completion of the transfer of one or more audio data samples, in step 31. If the completion of the transfer of one or more audio data samples is not the cause of the interrupt, the ISR proceeds to step 36 to perform other interrupt processing, such as the transfer of data communications data to or from the modem 16 or the servicing of a timer interrupt.

However, if the cause of the interrupt is the completion of the transfer of one or more digital audio data samples, the ISR reads one or more audio samples from the interface device 7, in step 32, and writes the one or more data samples to the sound system 11, in step 33. As shown, the ISR also reads one or more audio data samples from the sound system 11, in step 34, and writes the one or more data samples to the interface device 7, in step 35. The ISR then proceeds to step 36 to perform any other necessary interrupt processing.

Conclusion

Therefore, the present invention provides significant advantages over prior computer speakerphone systems. First, the modem of the present invention may be used with any portable computer which includes a sound system and an expansion bus, such as the PCMCIA bus, ISA bus or PCI bus. Second, the DSP of the modem performs echo cancellation and automatic gain control necessary for speakerphone applications thereby eliminating the need for the system processor to perform these tasks and further eliminating the need for dedicated hardware to perform the tasks. Third, the present invention utilizes the computer's sound system, speaker, and microphone rather than external amplifiers and other audio components and eliminates the need for a cable between the modem and sound system resulting in a light weight, compact solution which is particularly useful in portable and notebook applications. Fourth, the interface device of the modem presents the electrical characteristics of a conventional audio CODEC to the DSP of the modem, thereby allowing a pre-programmed DSP to be used in the modem.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer system configured for use as a speakerphone, comprising:
    an expansion bus coupled to a processor;
    a sound system operably coupled to said expansion bus;
    a modem operably coupled to said expansion bus and operable for coupling to a telephone line;
    wherein the processor is operable to place the modem in a speakerphone mode;
    wherein said sound system is operable to support speakerphone functionality and to receive a first analog audio input signal from a microphone and convert said first analog audio input signal into first digital audio output samples during a real-time speakerphone operation;
    wherein said first digital audio output samples are operable to be transferred from said sound system to said modem on said expansion bus during said speakerphone operation;
    wherein, when said modem is in said speakerphone mode, said modem is operable to convert said first digital audio output samples into a first analog audio output signal for transmission on the telephone line;
    wherein, when said modem is in said speakerphone mode, said modem is operable to receive a second analog audio input signal from the telephone line and convert said second analog audio input signal into second digital audio samples;
    wherein said second digital audio samples are operable to be transferred from said modem on said expansion bus to said sound system during said real-time speakerphone operation;
    wherein said sound system is operable to receive said second digital audio samples and convert said second digital audio samples into a second analog audio output signal for transmission to a speaker during said real-time speakerphone operation; and
    a direct memory access controller (DMAC) operable during said real-time speakerphone operation to transfer said first digital audio output samples from said sound system to said modem on said expansion bus and to transfer said second digital audio output samples from said modem on said expansion bus to said sound system.

2. The computer system of claim 1, wherein said expansion bus conforms to the Personal Computer Memory Card International Association (PCMCIA) specification, wherein said modem includes an interface portion for interfacing to said PCMCIA bus, wherein said interface portion conforms to the PCMCIA specification.

3. The computer system of claim 1, wherein said expansion bus is a bus selected from one of the set of buses comprising a CardBus, an Industry Standard Architecture (ISA) bus, a Peripheral Component Interconnect (PCI) bus, an SBUS, and a NuBus.

4. The computer system of claim 1, wherein during said real-time speakerphone operation said processor is operable to transfer said first digital audio output samples from said sound system to said modem on said expansion bus and to transfer said second digital audio output samples from said modem on said expansion bus to said sound system.

5. The computer system of claim 1, wherein said modem comprises:
    an interface device for operably coupling said modem to said expansion bus; and
    a coder-decoder (CODEC) coupled to said interface device;
    wherein, when said modem is in said speakerphone mode, said interface device is operable to receive said first digital audio output samples from said expansion bus and provide said first digital audio output samples to said CODEC;
    wherein, when said modem is in said speakerphone mode, said CODEC is operable to receive said first digital audio output samples from said interface device and convert said first digital audio output samples into said first analog audio output signal for transmission on the telephone line;
    wherein, when said modem is in said speakerphone mode, said CODEC is operable to receive said second analog audio input signal from the telephone line and convert said second analog audio input signal into said second digital audio samples;
    wherein, when said modem is in said speakerphone mode, said interface device is operable to receive said second digital audio samples from said CODEC and provide said second digital audio samples to said expansion bus.

6. The computer system of claim 5, wherein said interface device comprises:
    a parallel to serial converter configured to receive said first digital audio samples from said processor in a parallel format, to convert said first digital audio samples from a parallel format into a serial format, and to provide said first digital audio samples to said CODEC in said serial format; and
    a serial to parallel converter configured to receive said second digital audio samples from said CODEC in a serial format, to convert said second digital audio samples from a serial format into a parallel format, and to provide said second digital audio samples to said processor in a parallel format.

7. The computer system of claim 6, wherein said interface device further comprises interrupt logic for generating an interrupt to said processor upon completion of a transfer of one or more of said first digital audio samples from said parallel to serial converter to said CODEC and upon completion of a transfer of one or more of said second digital audio samples from said CODEC to said serial to parallel converter.

8. The computer system of claim 5, wherein said modem further comprises a digital signal processor (DSP) coupled between said CODEC and said interface device, wherein, when said modem is in said speakerphone mode, said DSP is operable to control data communications between said computer system and a data communications device coupled to the telephone line, wherein, when said modem is in said speakerphone mode, said DSP is further operable to transfer said first and second digital audio samples between said CODEC and said interface device.

9. The computer system of claim 8, wherein said modem further comprises an audio CODEC bus coupling said DSP and said interface device for transferring said first and second digital audio samples between said CODEC and said interface device when said modem is in said speakerphone mode, wherein said modem further comprises a parallel data bus for transferring data associated with said data communications between said DSP and said interface device.

10. The computer system of claim 8, wherein said DSP is configured to perform echo cancellation on said first and second digital audio samples when said modem is in said speakerphone mode.

11. The computer system of claim 8, wherein said DSP is configured to perform automatic gain control on said first and second digital audio samples when said modem is in said speakerphone mode.

12. The computer system of claim 1, wherein said modem is further configurable to operate in a second mode, wherein when configured in said second mode said modem is operable to perform data communications between said computer system and a data communications device on the telephone line.

13. A computer system configured for use as a speakerphone, comprising:

an expansion bus coupled to a processor;

a sound system operably coupled to said expansion bus;

a modem operably coupled to said expansion bus and operable for coupling to a telephone line;

wherein the processor is operable to place the modem in a speakerphone mode;

wherein said sound system is operable to support speakerphone functionality and to receive a first analog audio input signal from a microphone and convert said first analog audio input signal into first digital audio output samples during a real-time speakerphone operation;

wherein said first digital audio output samples are operable to be transferred from said sound system to said modem on said expansion bus during said speakerphone operation;

wherein, when said modem is in said speakerphone mode, said modem is operable to convert said first digital audio output samples into a first analog audio output signal for transmission on the telephone line;

wherein, when said modem is in said speakerphone mode, said modem is operable to receive a second analog audio input signal from the telephone line and convert said second analog audio input signal into second digital audio samples;

wherein said second digital audio samples are operable to be transferred from said modem on said expansion bus to said sound system during said real-time speakerphone operation;

wherein said sound system is operable to receive said second digital audio samples and convert said second digital audio samples into a second analog audio output signal for transmission to a speaker during said real-time speakerphone operation; and bus master logic, wherein, when said modem is in said speakerphone mode, said bus master logic is operable to become master of said expansion bus and to transfer said first digital audio output samples from said sound system to said modem on said expansion bus and to transfer said second digital audio output samples from said modem on said expansion bus to said sound system.

14. A modem configured to be placed in a speakerphone mode for speakerphone use, comprising:

an interface device for operably coupling said modem to an expansion bus of a computer system;

a coder-decoder (CODEC) coupled between said interface device and a telephone line;

wherein when said modem is in said speakerphone mode said interface device is operable to receive on the expansion bus first digital audio output samples from a sound system of the computer system and provide said first digital audio output samples to said CODEC for real-time speakerphone use;

wherein when said modem is in said speakerphone mode said CODEC is operable to receive said first digital audio output samples from said interface device and convert said first digital audio output samples into a first analog audio output signal for transmission on the telephone line;

wherein when said modem is in said speakerphone mode said CODEC is further operable to receive a second analog audio input signal from the telephone line and convert said second analog audio input signal into second digital audio samples for realtime speakerphone use;

wherein when said modem is in said speakerphone mode said interface device is further operable to receive said second digital audio samples from said CODEC and send said second digital audio samples on the expansion bus to the sound system of the computer system;

a digital signal processor (DSP) coupled between said CODEC and said interface device, wherein said DSP is operable to control data communications between a computer system and a data communications device coupled to the telephone line, wherein said DSP is further operable to transfer said first and second digital audio samples between said CODEC and said interface device; and an audio CODEC bus coupling said DSP and said interface device for transferring said first and second digital audio samples between said CODEC and said interface device, wherein said modem further comprises a parallel data bus for transferring data associated with said data communications between said DSP and said interface device.

15. The modem of claim 14, wherein said expansion bus conforms to the PCMCIA specification.

16. The modem of claim 14, wherein said expansion bus is selected from one of the set of buses comprising a CardBus, an Industry Standard Architecture (ISA) bus, a Peripheral Component Interconnect (PCI) bus, an SBUS, and a NuBus.

17. The modem of claim 14, wherein said interface device comprises:

a parallel to serial converter configured to receive said first digital audio samples from the expansion bus in a parallel format, to convert said first digital audio samples from a parallel format into a serial format, and to provide said first digital audio samples to said CODEC in said serial format; and a serial to parallel converter configured to receive said second digital audio samples from said CODEC in a serial format, to convert said second digital audio samples from a serial format into a parallel format, and to provide said second digital audio samples to the expansion bus in a parallel format.

18. The modem of claim 17, wherein said interface device further comprises interrupt logic for generating an interrupt to a system processor coupled to the expansion bus upon completion of a transfer of one or more of said first digital audio samples from said parallel to serial converter to said CODEC and upon completion of a transfer of one or more of said second digital audio samples from said CODEC to said serial to parallel converter.

19. The modem of claim 14, wherein said DSP is configured to perform echo cancellation on said first and second digital audio samples.

20. The modem of claim 14, wherein said DSP is configured to perform automatic gain control on said first and second digital audio samples.

21. The modem of claim 14, wherein said modem is configurable to operate in first and second modes, wherein when configured in said first mode said modem is operable for audio speakerphone use, wherein when configured in said second mode said modem is operable to perform data communications between a computer system and a data communications device on the telephone line.

22. The modem of claim 14, further comprising:
one or more memory buffers for storing said first and second digital audio samples; and
bus master logic coupled to said expansion bus, wherein said bus master logic is operable to become master of said expansion bus and to transfer said first digital audio output samples from said sound system to said memory buffers on said expansion bus and to transfer said second digital audio output samples from said memory buffers on said expansion bus to said sound system.

23. A method for operating a computer system as a speakerphone, wherein the computer system comprises an expansion bus, a sound system operably coupled to said expansion bus, and a modem operably coupled to said expansion bus and to a telephone line, the method comprising:
instructing said modem to enter a speakerphone mode;
said sound system receiving a first analog audio input signal from a microphone during a real-time speakerphone operation and converting said first analog audio input signal into first digital audio output samples;
transferring on said expansion bus said first digital audio output samples from said sound system to said modem in response to said sound system converting said first analog audio input signal into said first digital audio output samples during said real-time speakerphone operation;
said modem converting said first digital audio output samples from a parallel to a serial format and into a first analog audio output signal for transmission on the telephone line during said real-time speakerphone operation in response to said transferring said first digital audio output samples from said sound system to said modem;
said modem receiving a second analog audio input signal from the telephone line and converting said second analog audio input signal from a serial to a parallel format and into second digital audio samples during said real-time speakerphone operation;
generating a processor interrupt after said converting said second analog audio input signal from a serial to a parallel format;
transferring on said expansion bus said second digital audio samples from said modem to said sound system in response to said modem converting said second analog audio input signal into second digital audio samples during said real-time speakerphone operation;
said sound system receiving said second digital audio samples and converting said second digital audio samples into a second analog audio output signal for transmission to a speaker during said real-time speakerphone operation.

24. The method of claim 23, wherein said expansion bus conforms to the Personal Computer Memory Card International Association (PCMCIA) specification, wherein said modem includes an interface portion for interfacing to said PCMCIA bus, wherein said interface portion conforms to the PCMCIA specification, wherein said transferring said first digital audio output samples from said sound system to said modem and said transferring said second digital audio samples from said modem to said sound system comprises transfers performed in conformance with the PCMCIA specification.

25. The method of claim 23, wherein said transferring said first digital audio output samples from said sound system to said modem and said transferring said second digital audio samples from said modem to said sound system comprise a processor operably coupled to said expansion bus performing said transferring.

26. The method of claim 23, wherein said transferring said first digital audio output samples from said sound system to said modem and said transferring said second digital audio samples from said modem to said sound system comprise a direct memory access controller (DMAC) operably coupled to said expansion bus performing said transferring.

27. The method of claim 23, wherein said transferring said first digital audio output samples from said sound system to said modem and said transferring said second digital audio samples from said modem to said sound system comprise bus master logic included in said modem coupled to said expansion bus performing said transferring.

28. The method of claim 23, wherein said modem comprises an interface device for operably coupling said modem to said expansion bus and a coder-decoder (CODEC) coupled to said interface device, the method further comprising:
said interface device receiving said first digital audio output samples from said expansion bus and providing said first digital audio output samples to said CODEC;
said CODEC receiving said first digital audio output samples from said interface device and converting said first digital audio output samples into said first analog audio output signal for transmission on the telephone line;
said CODEC receiving said second analog audio input signal from the telephone line and converting said second analog audio input signal into said second digital audio samples;
said interface device receiving said second digital audio samples from said CODEC and providing said second digital audio samples to said expansion bus.

29. The method of claim 28, wherein said interface device comprises a parallel to serial converter and a serial to parallel converter, the method further comprising:
said parallel to serial converter receiving said first digital audio samples from said expansion bus in a parallel format, converting said first digital audio samples from a parallel format into a serial format, and providing said first digital audio samples to said CODEC in said serial format;

said serial to parallel converter receiving said second digital audio samples from said CODEC in a serial format, converting said second digital audio samples from a serial format into a parallel format, and providing said second digital audio samples to said expansion bus in a parallel format.

30. The method of claim 29, wherein said interface device further comprises interrupt logic, the method further comprising:

said interrupt logic generating an interrupt to a system processor operably coupled to said expansion bus upon completion of a transfer of one or more of said first digital audio samples from said parallel to serial converter to said CODEC;

said interrupt logic generating an interrupt to said processor upon completion of a transfer of one or more of said second digital audio samples from said CODEC to said serial to parallel converter.

31. The method of claim 28, wherein said modem further comprises a digital signal processor (DSP) coupled between said CODEC and said interface device, the method further comprising:

said DSP performing data communications between a data communications device coupled to the telephone line and a computer system during a first time period;

said DSP transferring said first and second digital audio samples between said CODEC and said interface device during a second time period.

32. The method of claim 31, further comprising said DSP performing echo cancellation on said first and second digital audio samples.

33. The method of claim 31, further comprising said DSP performing automatic gain control on said first and second digital audio samples.

\* \* \* \* \*